United States Patent
Kubota et al.

(10) Patent No.: US 12,411,732 B2
(45) Date of Patent: *Sep. 9, 2025

(54) MEMORY SYSTEM AND CONTROL METHOD

(71) Applicant: Kioxia Corporation, Tokyo (JP)

(72) Inventors: Takahiro Kubota, Kawasaki Kanagawa (JP); Hironori Uchikawa, Fujisawa Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 110 days.

This patent is subject to a terminal disclaimer.

(21) Appl. No.: 18/168,388

(22) Filed: Feb. 13, 2023

(65) Prior Publication Data

US 2024/0086280 A1 Mar. 14, 2024

(30) Foreign Application Priority Data

Sep. 14, 2022 (JP) ................. 2022-146299

(51) Int. Cl.
*G06F 11/00* (2006.01)
*G06F 11/07* (2006.01)
*G06F 11/10* (2006.01)
*G06F 11/34* (2006.01)

(52) U.S. Cl.
CPC ........ *G06F 11/1068* (2013.01); *G06F 11/076* (2013.01); *G06F 11/3466* (2013.01)

(58) Field of Classification Search
CPC . G06F 11/1068; G06F 11/076; G06F 11/3466
See application file for complete search history.

(56) References Cited

U.S. PATENT DOCUMENTS

| | | | | |
|---|---|---|---|---|
| 8,990,665 | B1 * | 3/2015 | Steiner | G11C 16/26 714/780 |
| 10,395,754 | B2 * | 8/2019 | Maffeis | H03M 13/6325 |
| 11,309,918 | B2 * | 4/2022 | Kumano | H03M 13/1108 |
| 2009/0319859 | A1 * | 12/2009 | Alrod | G06F 11/1068 714/752 |
| 2016/0276039 | A1 * | 9/2016 | Cai | G11C 29/028 |
| 2018/0137003 | A1 * | 5/2018 | Pignatelli | G06F 11/1012 |
| 2019/0089384 | A1 * | 3/2019 | Kumano | G06F 11/108 |
| 2020/0042384 | A1 * | 2/2020 | Kumar | H03M 13/3723 |
| 2020/0089417 | A1 * | 3/2020 | Kifune | G06F 3/0658 |
| 2021/0328597 | A1 | 10/2021 | Kumar et al. | |
| 2022/0083261 | A1 | 3/2022 | Fujiwara et al. | |
| 2022/0156142 | A1 | 5/2022 | Feng et al. | |
| 2022/0156143 | A1 | 5/2022 | Zamir et al. | |
| 2023/0052685 | A1 * | 2/2023 | Tate | H03M 13/45 |

* cited by examiner

*Primary Examiner* — Mujtaba M Chaudry
(74) *Attorney, Agent, or Firm* — Foley & Lardner LLP

(57) ABSTRACT

A memory system includes a non-volatile memory and a memory controller that encodes data with an error correction code and stores the encoded data in the non-volatile memory. The memory controller executes first processing which is at least a part of first decoding processing using read information read from the non-volatile memory, uses statistical information of a processing result of the first processing to estimate a first indicator indicating a ratio of hard errors among bit errors in the read information, determines parameters for second decoding processing having a higher latency than the first processing according to the first indicator, and executes the second decoding processing by using the determined parameters and the read information.

18 Claims, 4 Drawing Sheets

MEMORY SYSTEM AND CONTROL METHOD

CROSS-REFERENCE TO RELATED APPLICATION(S)

This application is based upon and claims the benefit of priority from Japanese Patent Application No. 2022-146299, filed Sep. 14, 2022, the entire contents of which are incorporated herein by reference.

FIELD

Embodiments described herein relate generally to a memory system and a control method.

BACKGROUND

In a memory system, error-correction encoded data is generally stored in order to protect stored data. Therefore, when reading the data stored in the memory system, the error-correction encoded data is decoded.

DETAILED DESCRIPTION

Embodiments provide a memory system and a control method capable of performing error correction (decoding) with higher accuracy.

In general, according to at least one embodiment, a memory system of an embodiment includes a non-volatile memory and a memory controller that encodes data with an error correction code and stores the encoded data in the non-volatile memory. The memory controller executes first processing which is at least a part of first decoding processing using read information read from the non-volatile memory, uses statistical information of a processing result of the first processing to estimate a first indicator indicating a ratio of hard errors among bit errors in the read information, determines parameters for second decoding processing having a higher latency than the first processing according to the first indicator, and executes the second decoding processing by using the determined parameters and the read information.

The memory system and the memory control method according to the embodiment will be described in detail with reference to the accompanying drawings. The present disclosure is not limited to the following embodiment.

Figure 1:
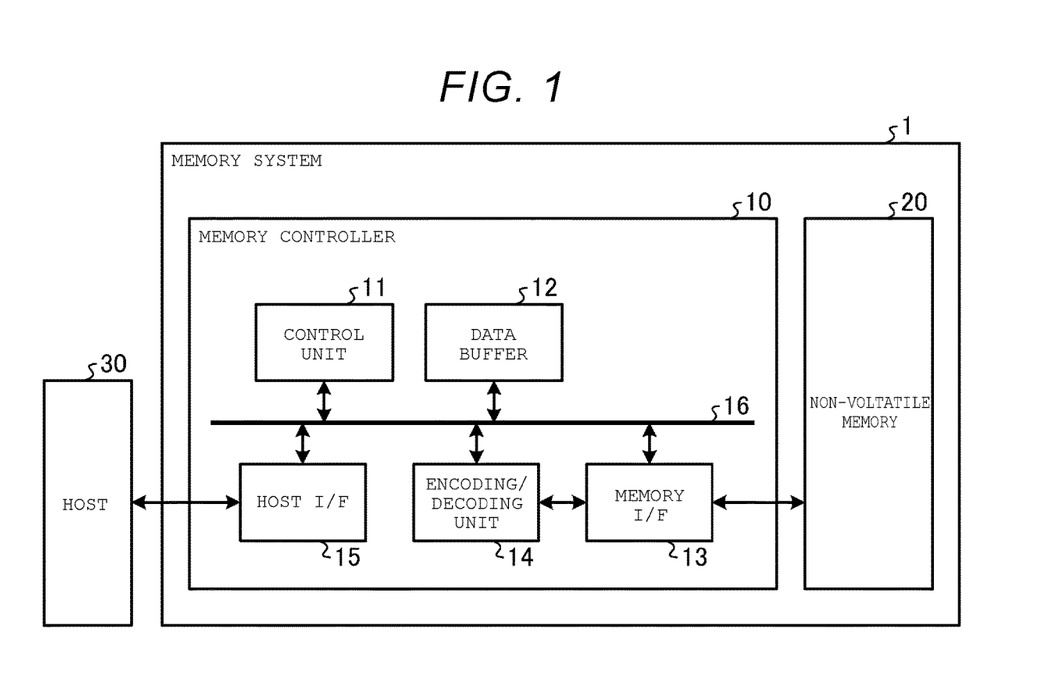
FIG. 1 is a block diagram of a memory system according to an embodiment.

FIG. 1 is a block diagram showing a schematic configuration example of the memory system according to the present embodiment. As shown in FIG. 1, a memory system 1 includes a memory controller 10 and a non-volatile memory 20. The memory system 1 can be connected to a host 30, and FIG. 1 shows a state in which the memory system 1 is connected to the host 30. The host 30 may be, for example, an electronic device such as a personal computer or a mobile terminal.

The non-volatile memory 20 is a non-volatile memory that stores data in a non-volatile manner, and is, for example, a NAND flash memory (hereinafter, simply referred to as a NAND memory). In the following description, a case where a NAND memory is used as the non-volatile memory 20 is illustrated, but the non-volatile memory 20 may be a storage device other than the NAND memory such as a three-dimensional structure flash memory, resistance random access memory (ReRAM), and ferroelectric random access memory (FeRAM). Further, the non-volatile memory 20 is not necessarily a semiconductor memory, and the present embodiment may be applied to various storage media other than the semiconductor memory.

The memory system 1 may be a memory card or the like in which the memory controller 10 and the non-volatile memory 20 are configured as one package, or may be a solid state drive (SSD) or the like.

The memory controller 10 is, for example, a semiconductor integrated circuit configured as a system-on-a-chip (SoC). A part or all of the operation of each component of the memory controller 10 described below may be implemented by a central processing unit (CPU) executing firmware, or may be implemented by hardware.

The memory controller 10 controls writing to the non-volatile memory 20 according to a write request from the host 30. Further, the memory controller 10 controls reading from the non-volatile memory 20 according to a read request from the host 30. The memory controller 10 includes a host I/F (host interface) 15, a memory I/F (memory interface) 13, a control unit 11, an encoding/decoding unit (codec) 14, and a data buffer 12. The host I/F 15, the memory I/F 13, the control unit 11, the encoding/decoding unit 14, and the data buffer 12 are connected to each other by an internal bus 16.

The host I/F 15 performs processing according to the interface standard with the host 30, and outputs a request received from the host 30, user data to be written, and the like to the internal bus 16. Further, the host I/F 15 transmits the user data read from the non-volatile memory 20 and restored, a response from the control unit 11, and the like to the host 30.

The memory I/F 13 performs a write operation to the non-volatile memory 20 based on an instruction of the control unit 11. Further, the memory I/F 13 performs a read operation from the non-volatile memory 20 based on an instruction of the control unit 11.

The data buffer 12 temporarily stores the user data received from the host 30 by the memory controller 10 until the user data is stored in the non-volatile memory 20. Further, the data buffer 12 temporarily stores the user data read from the non-volatile memory 20 until the user data is transmitted to the host 30. For the data buffer 12, for example, a general-purpose memory such as static random access memory (SRAM) or dynamic random access memory (DRAM) may be used.

The control unit 11 comprehensively controls each component of the memory system 1. When the control unit 11 receives a request from the host 30 via the host I/F 15, the control unit 11 performs control according to the request. For example, the control unit 11 instructs the memory I/F 13 to write user data and parity to the non-volatile memory 20 in response to a write request from the host 30. Further, the control unit 11 instructs the memory I/F 13 to read user data and parity from the non-volatile memory 20 in response to a read request from the host 30.

When the control unit 11 receives a user data write request from the host 30, the control unit 11 determines a storage area (memory area) on the non-volatile memory 20 with respect to the user data to be stored in the data buffer 12. That is, the control unit 11 manages the write destination of the user data. The correspondence between the logical address of the user data received from the host 30 and the physical address indicating the storage area on the non-volatile memory 20 in which the user data is stored is stored in, for example, the data buffer 12 as an address conversion table.

When the control unit 11 receives a read request from the host 30, the control unit 11 converts the logical address specified by the read request into a physical address by using the above-mentioned address conversion table, and instructs the memory I/F 13 to read from the physical address.

Here, in the NAND memory, writing and reading are generally performed in data units called pages, and erasing is performed in a predetermined data unit larger than a page. In at least one embodiment, a plurality of memory cells connected to the same word line are referred to as memory cell groups. When the memory cell is a single-level cell (SLC), one memory cell group corresponds to one page. When the memory cell is a multi-level cell (MLC), one memory cell group corresponds to a plurality of pages. In addition, each memory cell is connected to a word line and also to a bit line. Therefore, each memory cell can be identified by an address that identifies a word line and an address that identifies a bit line. A memory cell includes a control gate and a charge storage layer, and stores data in a non-volatile manner. The threshold voltage of the memory cell changes according to the number of electrons stored in the charge storage layer, and data corresponding to the difference in the threshold voltage is stored.

The user data transmitted from the host 30 is transferred to the internal bus 16 and temporarily stored in the data buffer 12. The encoding/decoding unit 14 encodes the user data stored in the non-volatile memory 20 with an error-correction code to generate encoded data (codeword). Further, the encoding/decoding unit 14 decodes the encoded data (also referred to as read information or received word) read from the non-volatile memory 20, and restores the user data. The data coded by the encoding/decoding unit 14 may include control data or the like used in the memory controller 10 in addition to the user data.

In the write operation in the memory system 1 having the above configuration, the control unit 11 instructs the encoding/decoding unit 14 to encode the user data at the time of writing to the non-volatile memory 20. At that time, the control unit 11 determines a storage location (storage address) of the codeword in the non-volatile memory 20, and also instructs the memory I/F 13 of the determined storage location. The encoding/decoding unit 14 encodes the user data on the data buffer 12 with an error-correction code based on the instruction from the control unit 11 to generate a codeword. As an encoding method, for example, an encoding method using low-density parity-check (LDPC) code, Bose-Chaudhuri-Hocquenghem (BCH) code, or Reed-Solomon (RS) code may be adopted. The memory I/F 13 writes the codeword to the non-volatile memory 20 based on the instruction from the control unit 11.

In the read operation, when reading from the non-volatile memory 20, the control unit 11 specifies an address on the non-volatile memory 20, and instructs the memory I/F 13 to read. Further, the control unit 11 instructs the encoding/decoding unit 14 to start decoding. The memory I/F 13 executes reading to the specified address of the non-volatile memory 20 according to the instruction of the control unit 11, and inputs the read information obtained by this reading to the encoding/decoding unit 14. Then, the encoding/decoding unit 14 decodes the input read information.

The encoding/decoding unit 14 may also be used, for example, as an encoding/decoding unit for each component code of a multidimensional error-correction code. The multidimensional error-correction code refers to a symbol in which at least one or more constituent units of an error-correction code are multiple protected by a plurality of smaller component codes. One symbol includes, for example, 1 bit (element of binary field) or an alphabetic element such as a finite field other than a binary field. An example in which 1 symbol is the base of 1 bit will be mainly described below.

Figure 2:
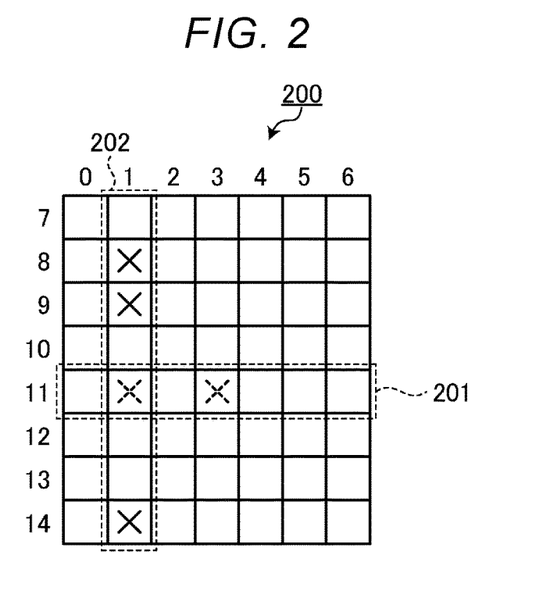
FIG. 2 is a configuration example of a product code.

As an example of multidimensional error correction codes, an example of the configuration of a product code is shown in FIG. 2. A product code 200 shown in FIG. 2 is an example of a product code using a BCH code capable of correcting 3 bits as component codes in the row direction and component codes in the column direction. The product code 200 is an example of a product code including 7 symbols (bits) in the row direction and 8 symbols (bits) in the column direction.

The number of symbols in the row direction and the column direction is not limited to the example in FIG. 2. Any code other than BCH may be used as component codes. For example, Reed-Solomon codes may be used as component codes in at least one of the row direction and the column direction.

In the decoding of the product code as shown in FIG. 2, for example, the encoding/decoding unit 14 first sequentially decodes the component codes in the row direction that constitute the product code. The encoding/decoding unit 14 decodes the component codes by, for example, limit distance decoding. When there is a component code that is not decoded successfully among the component codes in the row direction, the encoding/decoding unit 14 corrects errors that could be corrected in the decoding the component codes in the row direction, and decodes the component codes in the column direction. When there is a component code that is not decoded successfully among the component codes in the column direction, the encoding/decoding unit 14 corrects errors that could be corrected in the decoding of the component codes in the column direction, and re-decodes the component codes in the row direction. As described above, the decoding of the component codes in the row direction and the decoding of the component codes in the column direction are repeatedly executed until a termination condition is satisfied. In the following, decoding repeated in this way may be referred to as iterative decoding processing. The product code is used to implement an encoding method with high correction ability and low amount of calculation.

The multidimensional error-correction code is not limited to the product code 200 shown in FIG. 2, and may be, for example, a generalized low density parity check code (LDPC). General multidimensional error correcting codes including generalized LDPC codes may have different multiplicity of protection for each symbol. In general multidimensional error-correction codes, component codes may not be grouped in the row direction and the column direction, but the present technology may also be applied to a multidimensional error-correction code having such a code structure. In the following, a case in which a product code is used as a multidimensional error-correction code will be described as an example.

In the following, for the sake of simplicity, an example of using a two-dimensional error-correction code in which each symbol is protected by two component codes that can be grouped into a dimension 1 and a dimension 2 will be described. Each component code in each dimension contains one or more component codes defined for each dimension. In the following, a component code corresponding to each dimension containing one or more component codes may be referred to as a component code group. For example, a dimension 1 component code group and a dimension 2 component code group include n1 component codes and n2 component codes, respectively. The applicable error-correction code is not limited thereto, and may be an N-dimensional error-correction code in which at least one of the symbols constituting the code is protected by N component code groups (N is an integer of 2 or more). When expressed by the number of component codes included in each component code group, the N-dimensional error-correction code is protected by M component codes (M is the sum of ni (1≤i≤N), N is an integer of 2 or more, and ni is the number of component codes in an i-th dimension).

A symbol "x" in FIG. 2 indicates an error symbol. Whether each component code has an error can be determined based on, for example, whether a syndrome is 0 (without error) or not (with error). A component code 201 in the row direction contains two (2-bit) errors. A component code 202 in the column direction contains four (4-bit) errors. When using a BCH code that can correct 3 bits, the encoding/decoding unit 14 can correct the component code 201 in the row direction. As a result, the number of errors contained in the component code 202 in the column direction is reduced to three. Therefore, the encoding/decoding unit 14 can correct the component code 202 in the column direction.

Here, an example of processing of reading data from the non-volatile memory 20 and decoding processing of the read data will be described.

In the processing of reading data from the non-volatile memory 20, hard-determination reading (also referred to as hard-bit (HB) read) and soft-determination reading (also referred to as soft-bit (SB) read) are executed.

In the hard-determination reading, data of a hard-determination value (also referred to as hard-bit (HB) data) being binary data is read by applying a read voltage (hereinafter, referred to as HB read level) for switching the read bit value at (0, 1) to a word line connected to a memory cell to be read. In the soft-determination reading, data of a soft-determination value (also referred to as soft-bit (SB) data) is further read by applying a plurality of read levels (hereinafter, referred to as SB read level) obtained by shifting a voltage value from an HB read level to a value lower by a constant value and a value higher by a constant value to each memory cell.

The SB data read from each memory cell by SB read indicates how much the threshold voltage of each memory cell deviates from the assumed (0, 1) state (threshold voltage distribution). This SB data can be converted into a log-likelihood ratio (LLR) that expresses the reliability (value correctness) of the bit value read from each memory cell. For example, by using a table (LLR table) defining different LLR values for each combination of HB data and SB data, the LLR values are obtained from the read HB data and SB data.

There are hard-bit decoding (hard-determination decoding) and soft-bit decoding (soft-determination decoding) as decoding techniques for error correction codes. In the hard-bit decoding, the incoming value is a single bit (HB data) of either 0 or 1. In the soft-bit decoding, the incoming value is likelihood information such as a log-likelihood ratio that indicates the likelihood of 0 or 1.

LLRs are defined, for example, as follows. First, when a write value is b (b is 0 or 1), the probability that a received word is r is expressed as p(r|b). This probability p(r|b) is referred to as "likelihood of the write value b when the received word is r". In at least one embodiment, the log-likelihood ratio LLR of the write value b when the received word is r is expressed by the following equation.

$$LLR = \log\_e(p(r|0)/p(r|1))$$

For example, a positive LLR means that a write value of 0 is more likely than a write value of 1 when the received word is r. The greater the absolute value of the LLR, the greater the degree of likelihood.

For example, LLRs that take six values of −9, −3, −1, 1, 3, and 9 may be used. In the following, an error whose absolute value of the LLR corresponding to the bit where an error occurred is greater than those of other errors is referred to as a hard error. The condition that the absolute value of the LLR is greater than those of other errors is, for example, the condition that the absolute value is the maximum, the condition that the absolute value is greater than a threshold value, or the condition that the absolute value is in the top m (where m is an integer of 2 or more).

For example, in the case of LLRs that take the above six values, the bits corresponding to the LLRs with the maximum absolute values of −9 and 9 are bits in which a hard error occurred. A hard error can also be interpreted to mean that an error occurred despite the maximum absolute value of the LLR (high degree of likelihood).

In the decoding processing, the bit error rate (BER) at which successful error correction can be expected may differ by several tens of percent depending on the hard error rate (HER). Depending on the HER, the settings of parameters for the decoding processing that increases the correction ability may be different. HER is calculated by, for example, (the number of bits with hard errors)/(the number of bits with errors). HER is an example of the first indicator that indicates the ratio of hard errors. BER is calculated by, for example, (the number of bits with errors)/(bit length of codeword). BER is an example of the second indicator that indicates the ratio of bit errors.

In the present embodiment, HER and BER are estimated before decoding processing, and the settings of the parameters for decoding processing are determined (corrected) according to at least one of the estimated HER and BER. Details of the encoding/decoding unit 14 that performs such decoding will be described below.

Figure 3:
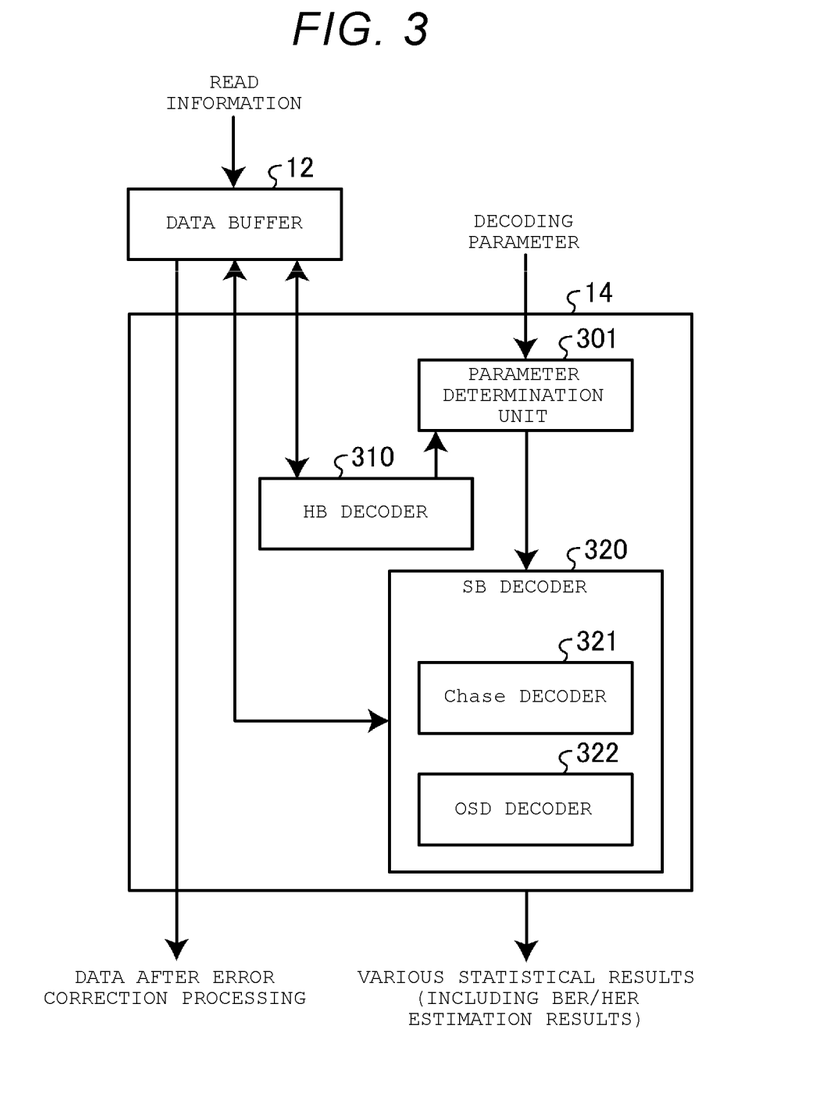
FIG. 3 is a block diagram of an encoding/decoding unit.

FIG. 3 is a block diagram showing an example of the functional configuration of the encoding/decoding unit 14. FIG. 3 shows an example of encoding/decoding a two-dimensional product code as shown in FIG. 2. A two-dimensional error correction code will be mainly described below as an example, but a similar method may be applied to an N-dimensional (N is an integer of 2 or more) error correction code.

As shown in FIG. 3, the encoding/decoding unit 14 includes an HB (hard bit) decoder 310, an SB (soft bit) decoder 320, and a parameter determination unit 301.

The HB decoder 310 executes hard-bit decoding. In at least one embodiment, the HB decoder 310 executes hard-bit decoding (an example of the first decoding processing) to estimate HER. The HB decoder 310 may be configured to execute a part of the hard-bit decoding (first processing) for obtaining information (for example, the number of error vectors found) necessary for HER and BER estimation. That is, the HB decoder 310 does not need to obtain a decoding result by hard-bit decoding. The decoding result of the received word is obtained by soft-bit decoding (an example of the second decoding processing) by the SB decoder 320.

In the following, the processing executed for HER and BER estimation (at least part of the hard-bit decoding) may be referred to as estimation processing.

The estimation processing may be processing with a smaller latency than the soft-bit decoding by the SB decoder 320. For example, the latency of the soft-bit decoding may be 100 μs to 800 μs. The hard-bit decoding (estimation processing) may have a simpler configuration than soft-bit decoding, and may have a latency of 3 μs, for example. If the latency is smaller than the soft-bit decoding by the SB decoder 320, for example, soft-bit decoding of a method different from the soft-bit decoding by the SB decoder 320 may be used as the estimation processing. In other words, the soft-bit decoding may be configured to have a longer latency than the estimation processing.

An example of estimation processing will be described below. The HB decoder 310 first calculates a syndrome for each of a plurality of component codes. The HB decoder 310 receives the calculated syndrome and decodes each component code. The HB decoder 310 calculates the number of component codes for which it is determined that "errors was corrected" during decoding. The number of component codes for which it is determined that "errors was corrected" can be obtained, for example, from the number of error vectors found. In the following, this number is defined as "the number of error vectors found".

The error vector is a vector having the same number of elements as the component code length, in which "1" is set at the location of the bit determined to have an "error" and other elements are expressed by 0. For example, when the data after the error correction encoding processing is (1, 1, 0, 0, 1) and the HB decoder 310 determines that "there are errors in the first and fifth bits", the error vector is (1, 0, 0, 0, 1).

Figure 4:
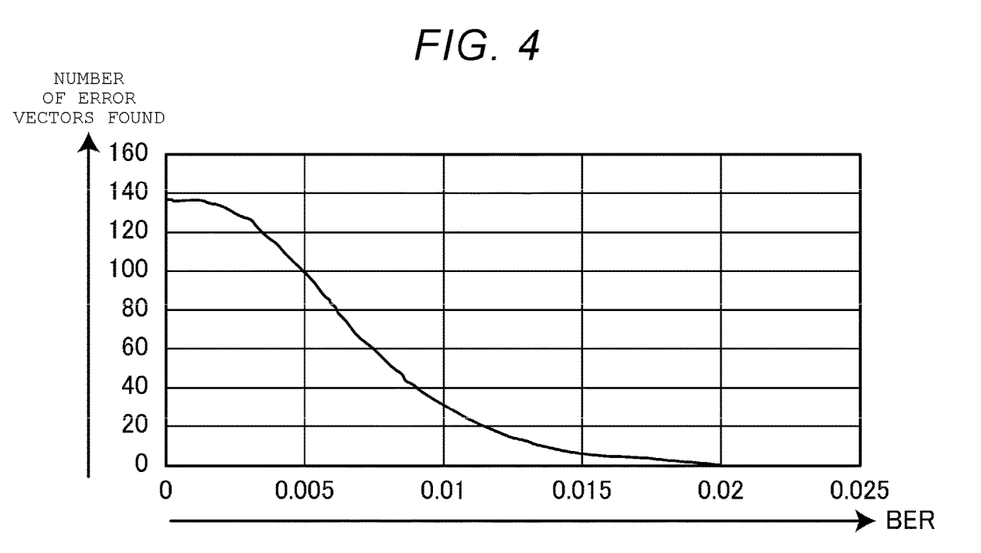
FIG. 4 is a diagram showing an example of the relationship between the number of error vectors found and BER.

The HB decoder 310 estimates BER corresponding to the calculated number of error vectors found by using correspondence information (such as a table) that associates the number of error vectors found with BER. FIG. 4 is a diagram showing an example of the relationship between the number of error vectors found and BER. A relationship such as that shown in FIG. 4 can be obtained, for example, through experiments or simulations. Correspondence information can be obtained in advance based on such relationships.

The HB decoder 310 uses the error vectors to estimate, as HER, the ratio of error bits (for example, error bits with the maximum absolute value of LLR) in which the absolute value of the LLR is larger than other error bits among the bits (error bits) determined to have errors.

In the following, BER and HER estimated by the HB decoder 310 may be referred to as estimated BER and estimated HER, respectively.

The number of error vectors found is an example of statistical information of the processing result of the estimation processing. The statistical information is not limited thereto, and may be the following information.

The sum of the number of one or more errors found during decoding of each of the component codes included in the N component code groups.

The sum of reliability at locations of one or more errors found during decoding of each component code included in N component code groups. The reliability is likelihood information, such as log-likelihood ratio (LLR).

Returning to FIG. 3, the SB decoder 320 executes soft-bit decoding. The SB decoder 320 includes a Chase decoder 321 and an ordered statistics decoding (OSD) decoder 322.

The Chase decoder 321 executes Chase decoding. Chase decoding is a method of flipping k locations out of n low-reliability bit locations and then trying to decode a BCH code (decoding to find the number of fixed errors). For example, Chase decoding is executed according to the specification of n=30, k=1 or the specification of n=10, k=3.

The OSD decoder 322 executes OSD. OSD is a decoding method similar to erasure correction for m low-reliability bit locations. For example, OSD is executed according to the specification of m=32.

The SB decoder 320 executes soft-bit decoding according to an algorithm ALG_A (second decoding algorithm) that is a hybrid of Chase decoding by the Chase decoder 321 and OSD by the OSD decoder 322.

An example of the algorithm ALG_A is described below.

(Example 1) Chase decoding and OSD are executed respectively, and the decoding result with the smaller number of corrections is employed.

(Example 2) Chase decoding and OSD are executed respectively, and the decoding result with higher reliability is employed. When the decoding results of both match, the reliability may be increased.

OSD has a high maximum correction ability, but it may be difficult to correct hard errors in the component codes. That is, the correction ability of OSD depends on HER. Chase decoding may also be run two to three times faster than OSD. Therefore, for example, when HER is large, a more accurate decoding result may be obtained by executing Chase decoding without executing OSD.

Therefore, in at least one embodiment, decoding parameters specifying whether to execute OSD (ON or OFF) may be used as the decoding parameters for soft-bit decoding. For example, the setting values of the decoding parameters are set so that OSD is not executed (set to OFF) when HER is equal to or greater than a threshold value.

The decoding parameters may be rephrased as parameters specifying an algorithm ALG_B (first decoding algorithm) to be executed when HER is equal to or greater than a threshold value and the algorithm ALG_A to be executed when HER is less than a threshold value. The algorithm ALG_B is an algorithm that executes Chase decoding without executing OSD. The SB decoder 320 executes the algorithm ALG_B (Chase decoding) and outputs the decoding result when a setting value indicating that OSD is not to be executed is set.

The decoding parameters are not limited to the above, and any parameters may be used as long as the parameters can improve the correction ability according to the setting value. The decoding executed by the algorithm ALG_A and the algorithm ALG_B is not limited to Chase decoding and OSD, and one or both thereof may be replaced with another decoding method.

The parameter determination unit 301 determines decoding parameters for soft-bit decoding by SB decoder 320 by using the estimation result from the estimation processing. The decoding parameters include at least decoding parameters specifying whether to execute OSD, as described above. The decoding parameters may include other parameters (for example, the number of iterations of soft-bit decoding).

For example, the parameter determination unit 301 determines the setting values of decoding parameters specifying whether to execute OSD to a setting value (for example, OFF) indicating that OSD is not to be executed when the estimated BER is equal to or less than a predetermined threshold value THA and the estimated HER is equal to or greater than a predetermined threshold value THB, and in other cases, determines the setting value to a setting value (for example, ON) indicating that OSD is to be executed.

The parameter determination unit 301 may determine the setting values of the decoding parameters specifying whether to execute OSD by using only one of the estimated BER and estimated HER. For example, the parameter determination unit 301 may determine the setting values of decoding parameters specifying whether to execute OSD to a setting value (for example, OFF) indicating that OSD is not to be executed when the estimated HER is equal to or greater than the predetermined threshold value THB, and in other cases, may determine the setting value to a setting value (for example, ON) indicating that OSD is to be executed.

The encoding/decoding unit 14 executes encoding and decoding while storing various data in the data buffer 12. The encoding/decoding unit 14 reads the decoded data from the data buffer 12 as a decoding result and outputs the same. The encoding/decoding unit 14 may output various statistical results regarding the decoding result. The statistical results may include, for example, estimation results of BER and HER (estimated BER and estimated HER). For example, the output estimation result is referred to when determining whether to rewrite data in the non-volatile memory 20 according to the estimated BER.

Figure 5:
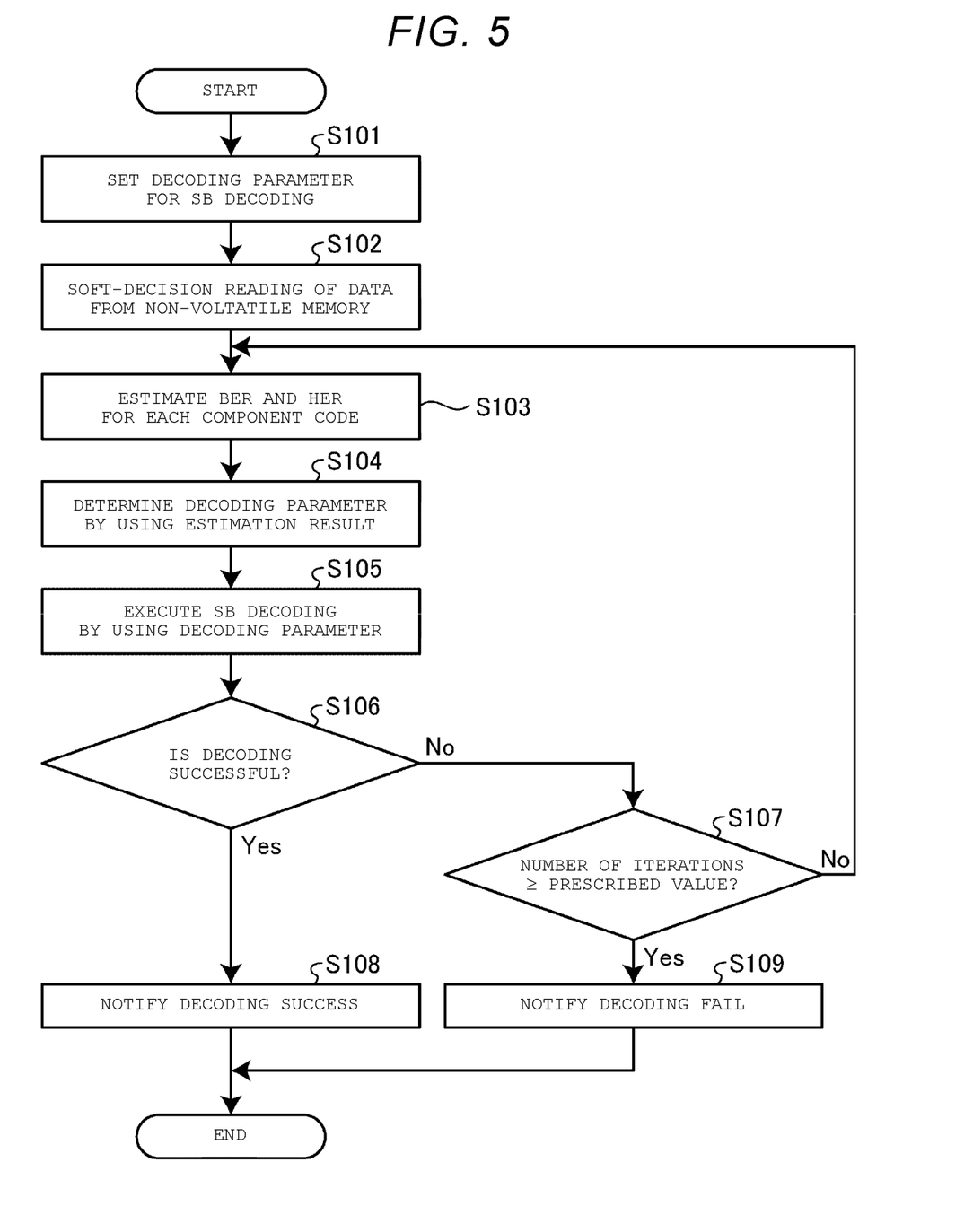
FIG. 5 is a flowchart of decoding processing by the memory system of the embodiment.

FIG. 5 is a flowchart showing an example of the decoding processing by the memory system of the present embodiment. FIG. 5 shows an example of decoding processing for a two-dimensional error-correction code.

The parameter determination unit 301 determines setting values of decoding parameters for soft-bit decoding, and sets the determined setting values (step S101). For example, the parameter determination unit 301 sets a value specified in advance (such as a default value) as a setting value for each decoding parameter.

The control unit 11 reads the error-correction code from the non-volatile memory 20 by soft-determination reading and obtains the read information (step S102).

The encoding/decoding unit 14 executes iterative decoding processing on two-dimensional component codes of dimension 1 (for example, row direction) and dimension 2 (for example, column direction) in steps S103 to S109 below.

The encoding/decoding unit 14 estimates BER and HER for each component code included in the component code group of the dimension to be processed (step S103).

The parameter determination unit 301 determines decoding parameters for soft-bit decoding by using the estimated BER and estimated HER (step S104). For example, the parameter determination unit 301 determines the setting values of decoding parameters specifying whether to execute OSD as a setting value (for example, OFF) indicating that OSD is not to be executed when the estimated BER is equal to or less than the predetermined threshold value THA and the estimated HER is equal to or greater than the predetermined threshold value THB.

When the setting value was already set in step S101, the parameter determination unit 301 corrects the set setting value based on the value determined in step S104. When the setting value was not already set in step S101, the parameter determination unit 301 sets the setting value determined in step S104. When setting values for all decoding parameters are determined in step S104, step S101 may not be executed.

The SB decoder 320 executes soft-bit decoding by using the set decoding parameters (step S105). For example, when a setting value indicating that OSD is not to be executed is set, the SB decoder 320 executes the algorithm ALG_B. That is, the SB decoder 320 does not execute OSD, executes Chase decoding, and outputs the decoding result of soft-bit decoding. When the setting value is set to indicate that OSD is to be executed, the SB decoder 320 executes the algorithm ALG_A. That is, the SB decoder 320 executes both OSD and Chase decoding, and outputs the decoding result of soft-bit decoding according to either (Example 1) or (Example 2) above.

Next, the encoding/decoding unit 14 determines whether the decoding is successful (step S106). Successful decoding may mean, for example, that a decoded word that can be determined to be correct is found.

When the decoding is not successful (step S106: No), the encoding/decoding unit 14 determines whether the number of iterations of the iterative decoding processing reaches a predetermined specified value (step S107). When the specified value did not reach (step S107: No), the encoding/decoding unit 14 increases the iteration count by 1, returns to step S103, and repeats the processing for the next dimension. When the number of iterations reached the specified value (Step S107: Yes), the encoding/decoding unit 14 notifies an external control unit or the like of a decoding failure (step S109) and ends decoding processing. The number of iterations may be, for example, the number of times the operations of steps S103 to S105 are repeated.

When the decoding is successful (step S106: Yes), the encoding/decoding unit 14 notifies the external control unit or the like of the decoded word with the success of the decoding (step S108), and ends the decoding processing.

In this way, the memory system of at least one embodiment uses at least one of BER and HER estimated by estimation processing (such as hard-bit decoding) with a smaller latency than soft-bit decoding to determine parameters for soft-bit decoding and execute the soft-bit decoding according to the determined parameter. Since parameters can be determined so as to improve the correction ability according to BER and HER, error correction (decoding) can be executed with higher accuracy. The estimation of BER and HER may have a lower latency than soft-bit decoding. Therefore, it is possible to implement error correction with higher accuracy without increasing latency.

Modification Example 1

In Modification Example 1, another example of decoding parameters determined according to the estimation result of the estimation processing is described. In at least one modification example, the decoding parameters are used to set whether to skip execution of soft-bit decoding by the SB decoder 320.

For example, the parameter determination unit 301 determines the setting values of the decoding parameters to a setting value indicating that soft-bit decoding is to be skipped when the estimated BER is equal to or less than the predetermined threshold value THA and the estimated HER is equal to or greater than the predetermined threshold value THB, and in other cases, determines to a setting value indicating that the soft-bit decoding is not to be skipped.

In the present modification example, when decoding parameters indicating that soft-bit decoding is to be skipped are set, for example, the encoding/decoding unit 14 is configured to execute decoding processing (DC) (third decoding processing) different from the soft-bit decoding by the SB decoder (320). The decoding processing DC may be any type of decoding processing, and is, for example, a decoding processing that may succeed even if the BER or HER is large. For example, the decoding processing DC is processing of decoding a higher-layer product code in which read information (codewords) to be a target of soft-bit decoding is used as a component code.

By allowing soft-bit decoding to be skipped as in the present modification example, the latency of the decoding processing may be reduced in some cases.

Modification Example 2

Since the decoding parameters for soft-bit decoding are determined according to the estimation result of BER or HER, the accuracy of the estimation processing may affect the accuracy of soft-bit decoding. In Modification Example 2, a function for improving accuracy of estimation processing of BER or HER is described. In the estimation processing, it is desirable to prevent "collection of wrong samples due to erroneous correction" and to collect more samples. In the present modification example, the HB decoder 310 executes any one of functions 1 to 3 below.

Function 1: In the decoding of each component code, when the correctable number is t, only error vectors with a weight less than t are employed, and the number of error vectors found is obtained. An error vector with a weight less than t represents an error vector in which the number of elements set with "1" (elements corresponding to bits determined to have an error) is less than t. For example, when a BCH code is used as a component code, the correctable number t is determined, and errors of t or less can always be corrected. The greater the number of corrections (rewrites) during error correction, the higher the probability of erroneous correction. The component code is not limited to the BCH code, and may be any other code to be a target of decoding processing for "correcting only the number of errors equal to or less than a threshold value".

Function 1 may be configured to switch the error vector to be employed according to the progress of the iterative decoding processing, as described below.

In the first half of the iterations (for example, up to a certain number of iterations), only error vectors with a weight less than t are employed, and in the second half of iterations (for example, the number of iterations is equal to or greater than a certain value), all error vectors are employed.

Function 2: Execute rollback in the decoding of a product code. Rollback means processing of returning the decoding result of the component code when erroneous correction is suspected in a certain component code when the component codes constituting the product code are sequentially decoded. The returning processing is, for example, processing of restoring the value before decoding. An example of a criterion for "erroneous correction is suspected" is "after correcting a certain bit location x of a component code CA in a certain dimension (for example, row direction), the correction of a component code CB in another dimension (for example, column direction) protecting the bit of the bit location x does not advance". This criterion is based on the idea that, if correctly corrected, the bit at the bit location x should be corrected to reduce errors in the component code CA to make it easier to correct errors in the component code CB as well.

Function 3: For HB data, perform estimation processing (for example, turbo decoding) including processing for outputting decoding reliability (positive correction probability estimated value and the like) and employ only the correction result of the component code whose reliability is equal to or greater than a threshold value to determine the number of error vectors found.

As described above, according to at least one embodiment, error correction (decoding) can be executed with higher accuracy.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a non-volatile memory; and
   a memory controller configured to encode data with an error correction code and store the encoded data in the non-volatile memory, wherein
   the memory controller is configured to:
      execute first processing, the first processing being at least a part of hard bit decoding processing, using read information read from the non-volatile memory,
      estimate a first indicator using statistical information of a processing result of the first processing, the first indicator indicating a ratio of hard errors among bit errors in the read information,
      determine parameters for soft bit decoding processing using the first indicator, and
      execute the soft bit decoding processing using the determined parameters and the read information.

2. The memory system according to claim 1, wherein
   the encoded data is an N-dimensional error correction code in which at least one of symbols included in a code is protected by N component code groups (N being an integer of 2 or more), respectively, and
   wherein the memory controller being configured to estimate the first indicator includes uses the statistical information on component codes, in which the number of errors is less than the number of errors that are correctable by the soft bit decoding processing among the component codes included in the N component code groups.

3. The memory system according to claim 1, wherein
   the encoded data is an N-dimensional error correction code in which at least one of symbols included in a code is protected by N component code groups (N being an integer of 2 or more), respectively, and
   the memory controller is configured to:
      determine whether a decoding result of the soft bit decoding processing for component codes included in the N component code groups is an erroneous correction, and
      execute rollback for returning the decoding result that is determined to be the erroneous correction.

4. The memory system according to claim 1, wherein
   the encoded data is an N-dimensional error correction code in which at least one of symbols included in a code is protected by N component code groups (N being an integer of 2 or more), respectively,
   wherein the memory controller being configured to execute the first processing includes processing for outputting reliability of decoding using the read information, and
estimate the first indicator includes using the statistical information on component codes having the reliability equal to or greater than a threshold value to estimate the first indicator.

5. The memory system according to claim 1, wherein
the encoded data is an N-dimensional error correction code in which at least one of symbols included in a code is protected by N component code groups (N being an integer of 2 or more), respectively, and
the statistical information is the number of component codes, among the component codes included in the N component code groups, for which it is determined that errors are corrected.

6. The memory system according to claim 1, wherein
the encoded data is an N-dimensional error correction code in which at least one of symbols included in a code is protected by N component code groups (N being an integer of 2 or more), respectively, and
the statistical information is the sum of the number of one or more errors found during decoding of each of component codes included in the N component code groups.

7. The memory system according to claim 1, wherein
the encoded data is an N-dimensional error correction code in which at least one of symbols included in a code is protected by N component code groups (N being an integer of 2 or more), respectively, and
the statistical information is the sum of reliability at one or more locations of errors found during decoding of each of component codes included in the N component code groups.

8. The memory system according to claim 7, wherein
the reliability is likelihood information of each bit included in the read information read from the non-volatile memory.

9. The memory system according to claim 1, wherein
the parameters are parameters specifying (i) a first decoding algorithm to be executed when the first indicator is equal to or greater than a threshold value and (ii) a second decoding algorithm to be executed when the first indicator is smaller than the threshold value.

10. The memory system according to claim 9, wherein
the first decoding algorithm is Chase decoding.

11. The memory system according to claim 9, wherein
the second decoding algorithm is an algorithm that is a hybrid of Chase decoding and ordered statistics decoding (OSD).

12. The memory system according to claim 1, wherein
the memory controller determines parameters for the soft bit decoding processing according to (i) the first indicator and (ii) a second indicator indicating a ratio of the bit errors.

13. The memory system according to claim 1, wherein
the parameters indicate whether to skip execution of the soft bit decoding processing, and
when the parameters indicating that execution of the soft bit decoding processing is to be skipped are determined, the memory controller executes third decoding processing using the read information.

14. The memory system according to claim 1, wherein
the memory controller is configured to output the first indicator.

15. The memory system according to claim 1, wherein
the first processing is a part of the hard-bit decoding for obtaining information necessary for estimation of the first indicator.

16. The memory system according to claim 15, wherein
the memory controller is configured to use the statistical information and likelihood information based on the read information to calculate the first indicator.

17. The memory system according to claim 1, wherein
the soft bit decoding processing has a higher latency than the first processing.

18. A control method of a non-volatile memory executed in a memory system, the method comprising:
encoding data with an error correction code and storing the encoded data in the non-volatile memory;
executing first processing which is at least part of hard bit decoding processing using read information read from the non-volatile memory;
estimating a first indicator using statistical information of a processing result of the first processing, the first indicator indicating a ratio of hard errors among bit errors in the read information;
determining parameters for soft bit decoding processing using the first indicator; and
executing the soft bit decoding processing using the determined parameters and the read information.

* * * * *